United States Patent [19]

Betensky et al.

[11] Patent Number: 4,838,668
[45] Date of Patent: Jun. 13, 1989

[54] ZOOM LENS

[75] Inventors: Ellis I. Betensky, Redding, Conn.;
Melvyn H. Kreitzer, Cincinnati, Ohio

[73] Assignee: Eastman Kodak Company, Rochester, N.Y.

[21] Appl. No.: 107,223

[22] Filed: Oct. 9, 1987

[51] Int. Cl.$^4$ .................. G02B 15/177; G02B 9/64
[52] U.S. Cl. .................................. 350/427; 354/222
[58] Field of Search ..................... 350/427; 354/222

[56] References Cited

U.S. PATENT DOCUMENTS

| | | |
|---|---|---|
| 3,273,457 | 9/1966 | Macher et al. |
| 3,972,056 | 7/1976 | Tsujimoto et al. ................ 354/25 |
| 4,185,191 | 1/1980 | Stsuffer ........................... 250/204 |
| 4,304,466 | 12/1981 | Betensky ......................... 350/426 |
| 4,387,967 | 6/1983 | Yamazaki et al. ................. 350/423 |
| 4,506,970 | 3/1985 | Fujibayashi ....................... 354/406 |
| 4,529,286 | 7/1985 | Fujii ................................. 354/402 |
| 4,609,944 | 9/1986 | Nakada et al. .................... 358/228 |
| 4,694,151 | 9/1987 | Yoshimura ....................... 250/201 |

FOREIGN PATENT DOCUMENTS 6266219 3/1977 Japan .
62-66218 3/1987 Japan .

Primary Examiner—Bruce Y. Arnold
Assistant Examiner—Rebecca D. Gass
Attorney, Agent, or Firm—John B. Turner

[57] ABSTRACT

A zoom taking lens for a photographic single lens reflex (SLR) camera. The lens has an air space between elements of the lens, which air space is large enough to accommodate reflective means for directing rays which have passed through elements of the lens in front of the reflective means, to viewfinder means. By being able to accommodate the reflective means within the length of the lens and with the reflective means being axially movable the back focal length of the lens may be much smaller than is the case in a conventional SLR camera in which the reflective means is movable into and out of the back focal length between the rearmost element of the lens and the film of the camera.

34 Claims, 18 Drawing Sheets

| SURFACE NUMBER | RADIUS | THICKNESS | REFRACTIVE INDEX d | Abbe' v NUMBER | CLEAR APERTURE |
|---|---|---|---|---|---|
| 1a | 136.35 | 1.80 | 1.773 | 49.6 | 43.08 |
| 2a | 26.31 | 11.06 | | | 36.07 |
| 3a | -72.81 | 1.78 | 1.487 | 70.4 | 35.39 |
| 4a | -234.33 | 0.10 | | | 35.10 |
| 5a | 47.70 | 3.04 | 1.847 | 23.8 | 34.29 |
| 6a | 99.09 | 50.02 | | | 33.69 |
| 7a | 42.53 | 4.35 | 1.694 | 53.3 | 26.65 |
| 8a | -79.82 | 0.20 | | | 26.56 |
| 9a | 24.54 | 5.65 | 1.487 | 70.4 | 24.80 |
| 10a | -78.48 | 1.00 | 1.847 | 23.8 | 23.95 |
| 11a | 58.17 | 24.00 | | | 22.67 |
| 12a | -26243.13 | 6.00 | 1.593 | 35.3 | 19.48 |
| 13a | -16.34 | 1.04 | 1.804 | 46.5 | 20.52 |
| 14a | -42.83 | 3.65 | | | 22.29 |
| 15a | -15.01 | 1.20 | 1.773 | 49.6 | 22.36 |
| 16a | -37.33 | 0.25 | | | 26.77 |
| 17a | 675.43 | 6.00 | 1.522 | 59.5 | 38.23 |
| 18a | -50.95 | 6.50 | | | 38.71 |

FIG. 7 (TABLE 1)

| SURFACE NUMBER | RADIUS | THICKNESS | REFRACTIVE INDEX d | Abbe' v NUMBER | CLEAR APERTURE |
|---|---|---|---|---|---|
| 1b | 150.63 | 1.80 | 1.773 | 49.6 | 40.45 |
| 2b | 26.16 | 10.32 | | | 34.07 |
| 3b | -76.64 | 1.78 | 1.589 | 61.3 | 33.08 |
| 4b | -216.81 | 0.10 | | | 32.76 |
| 5b | 47.79 | 3.04 | 1.847 | 23.8 | 31.86 |
| 6b | 111.59 | 43.28 | | | 31.21 |
| 7b | 45.49 | 4.75 | 1.694 | 53.3 | 27.09 |
| 8b | -73.96 | 0.20 | | | 27.00 |
| 9b | 24.86 | 6.03 | 1.487 | 70.4 | 25.17 |
| 10b | -69.88 | 1.00 | 1.847 | 23.8 | 24.20 |
| 11b | 58.02 | 23.51 | | | 22.89 |
| 12b | 80.55 | 1.27 | 1.804 | 46.5 | 21.33 |
| 13b | 21.98 | 5.20 | 1.640 | 34.6 | 21.95 |
| 14b | -95.84 | 5.02 | | | 22.47 |
| 15b | -14.60 | 1.20 | 1.773 | 49.6 | 22.60 |
| 16b | -43.85 | 0.25 | | | 27.52 |
| 17b | 548.05 | 6.10 | 1.517 | 64.2 | 38.92 |
| 18b | -47.25 | 6.48 | | | 39.29 |

FIG. 10 (TABLE 3)

| SURFACE NUMBER | RADIUS | THICKNESS | REFRACTIVE INDEX d | Abbe' v NUMBER | CLEAR APERTURE |
|---|---|---|---|---|---|
| 1c | 527.19 | 1.57 | 1.835 | 43.0 | 31.56 |
| 2c | 24.88 | 4.65 | | | 27.34 |
| 3c | -191.08 | 1.55 | 1.835 | 43.0 | 27.32 |
| 4c | 238.55 | 3.22 | | | 26.99 |
| 5c | 48.32 | 3.39 | 1.830 | 24.0 | 26.48 |
| 6c | 950.17 | 41.83 | | | 26.05 |
| 7c | 33.06 | 5.34 | 1.487 | 70.4 | 25.23 |
| 8c | -55.72 | 0.17 | | | 25.16 |
| 9c | 23.69 | 5.65 | 1.501 | 56.3 | 23.69 |
| 10c | -52.31 | 1.00 | 1.847 | 23.8 | 22.99 |
| 11c | 84.66 | 19.50 | 1.487 | 70.4 | 21.97 |
| 12c | 34.63 | 4.40 | | | 18.62 |
| 13c | -28.50 | 0.70 | | | 18.83 |
| 14c | -20.47 | 1.00 | 1.804 | 46.5 | 18.83 |
| 15c | 19.85 | 6.76 | 1.687 | 31.9 | 21.25 |
| 16c | -35.05 | 1.75 | | | 22.23 |
| 17c | -20.48 | 1.04 | 1.835 | 43.0 | 22.34 |
| 18c | -32.89 | 4.15 | | | 24.01 |
| 19c | -19.74 | 1.31 | 1.773 | 49.6 | 25.46 |
| 20c | -36.60 | 6.81 | | | 28.92 |

FIG. 13 (TABLE 5)

| SURFACE NUMBER | RADIUS | THICKNESS | REFRACTIVE INDEX d | Abbé ν NUMBER | CLEAR APERTURE |
|---|---|---|---|---|---|
| 1d | 1497.05 | 1.80 | 1.835 | 43.0 | 40.70 |
| 2d | 32.74 | 4.95 | | | 35.40 |
| 3d | 594.43 | 1.78 | 1.835 | 43.0 | 35.40 |
| 4d | 59.55 | 5.27 | | | 34.43 |
| 5d | 56.11 | 4.30 | 1.785 | 26.1 | 34.80 |
| 6d | -370.00 | 52.70 | | | 34.52 |
| 7d | 36.58 | 5.58 | 1.487 | 70.4 | 28.92 |
| 8d | -69.18 | 0.20 | | | 28.85 |
| 9d | 25.58 | 6.60 | 1.501 | 56.3 | 27.09 |
| 10d | -60.42 | 1.00 | 1.847 | 23.8 | 26.32 |
| 11d | 84.06 | 22.00 | | | 25.01 |
| 12d | 36.46 | 4.20 | 1.487 | 70.4 | 18.74 |
| 13d | -26.01 | 0.29 | | | 18.71 |
| 14d | -22.94 | 1.00 | 1.804 | 46.5 | 18.70 |
| 15d | 24.88 | 6.38 | 1.673 | 32.2 | 20.65 |
| 16d | -32.50 | 1.09 | | | 21.76 |
| 17d | -21.63 | 0.80 | 1.835 | 43.0 | 21.77 |
| 18d | -35.82 | 6.87 | | | 23.05 |
| 19d | -19.92 | 1.50 | 1.773 | 49.6 | 25.90 |
| 20d | -48.90 | 6.50 | | | 30.21 |

FIG. 16 (TABLE 7)

| SURFACE NUMBER | RADIUS | THICKNESS | REFRACTIVE INDEX d | Abbé v NUMBER | CLEAR APERTURE |
|---|---|---|---|---|---|
| 1e | -278.18 | 1.80 | 1.835 | 43.0 | 40.70 |
| 2e | 37.82 | 3.89 | | | 35.99 |
| 3e | 238.35 | 1.80 | 1.834 | 37.3 | 35.99 |
| 4e | 62.99 | 6.54 | | | 35.08 |
| 5e | 60.92 | 4.06 | 1.805 | 25.5 | 35.19 |
| 6e | -731.43 | 54.78 | | | 34.86 |
| 7e | 38.66 | 5.89 | 1.517 | 52.2 | 28.60 |
| 8e | -62.93 | 0.20 | | | 28.49 |
| 9e | 27.72 | 6.72 | 1.501 | 56.3 | 26.61 |
| 10e | -49.55 | 1.00 | 1.847 | 23.8 | 25.64 |
| 11e | 79.47 | 24.14 | | | 24.36 |
| 12e | 30.16 | 4.31 | 1.487 | 70.4 | 20.53 |
| 13e | -39.52 | 0.20 | | | 20.54 |
| 14e | -40.93 | 1.00 | 1.804 | 46.5 | 20.48 |
| 15e | 19.23 | 7.56 | 1.640 | 34.6 | 21.35 |
| 16e | -28.45 | 1.04 | | | 22.16 |
| 17e | -20.44 | 1.00 | 1.835 | 43.0 | 22.16 |
| 18e | -41.77 | 5.01 | | | 23.72 |
| 19e | -19.52 | 1.50 | 1.773 | 49.6 | 25.09 |
| 20e | -61.52 | 6.50 | | | 29.55 |

FIG. 19 (TABLE 9)

| SURFACE NUMBER | RADIUS | THICKNESS | REFRACTIVE INDEX d | Abbé v NUMBER | CLEAR APERTURE |
|---|---|---|---|---|---|
| 1f | 196.37 | 2.20 | 1.773 | 49.6 | 42.77 |
| 2f | 27.30 | 10.91 | | | 35.77 |
| 3f | -79.38 | 2.00 | 1.487 | 70.4 | 34.91 |
| 4f | -508.48 | 0.10 | | | 34.57 |
| 5f | 51.91 | 3.15 | 1.847 | 23.8 | 34.00 |
| 6f | 140.11 | 49.35 | | | 33.47 |
| 7f | 46.11 | 4.45 | 1.694 | 53.3 | 26.89 |
| 8f | -75.90 | 0.20 | | | 26.82 |
| 9f | 25.45 | 5.75 | 1.487 | 70.4 | 25.14 |
| 10f | -74.42 | 1.00 | 1.847 | 23.8 | 24.28 |
| 11f | 62.02 | 26.00 | | | 23.06 |
| 12f | 150.58 | 6.00 | 1.593 | 35.3 | 21.01 |
| 13f | -18.26 | 1.05 | 1.806 | 40.7 | 21.76 |
| 14f | -42.29 | 3.35 | | | 23.24 |
| 15f | -16.30 | 1.20 | 1.804 | 46.5 | 23.28 |
| 16f | -61.93 | 0.25 | | | 28.00 |
| 17f | 3765.78 | 6.00 | 1.620 | 36.3 | 38.53 |
| 18f | -50.68 | 6.50 | | | 39.06 |

FIG. 20 (TABLE II)

| SURFACE NUMBER | RADIUS | THICKNESS | REFRACTIVE INDEX d | Abbé ν NUMBER | CLEAR APERTURE |
|---|---|---|---|---|---|
| 1g | 2134.57 | 2.00 | 1.773 | 49.6 | 41.41 |
| 2g | 30.07 | 10.56 | | | 35.47 |
| 3g | 38.80 | 3.20 | 1.847 | 23.8 | 32.88 |
| 4g | 54.57 | 46.02 | | | 31.76 |
| 5g | 55.73 | 4.10 | 1.694 | 53.3 | 25.82 |
| 6g | -70.12 | 0.20 | | | 25.63 |
| 7g | 20.67 | 5.85 | 1.501 | 56.3 | 24.01 |
| 8g | -117.34 | 1.00 | 1.847 | 23.8 | 23.12 |
| 9g | 48.71 | 31.01 | | | 21.85 |
| 10g | -12.17 | 1.20 | 1.804 | 46.5 | 20.74 |
| 11g | -20.92 | 0.25 | | | 25.18 |
| 12g | 126.28 | 6.90 | 1.806 | 40.7 | 42.23 |
| 13g | -62.59 | 6.50 | | | 42.36 |

FIG. 22 (TABLE 13)

| SURFACE NUMBER | RADIUS | THICKNESS | REFRACTIVE INDEX d | Abbé ν NUMBER | CLEAR APERTURE |
|---|---|---|---|---|---|
| 1h | 178.81 | 2.20 | 1.773 | 49.6 | 42.99 |
| 2h | 27.07 | 10.57 | | | 35.90 |
| 3h | -97.04 | 2.00 | 1.487 | 70.4 | 35.10 |
| 4h | 356.84 | 0.10 | | | 34.61 |
| 5h | 51.05 | 3.25 | 1.847 | 23.8 | 34.26 |
| 6h | 165.03 | 48.79 | | | 33.80 |
| 7h | 44.49 | 4.45 | 1.694 | 53.3 | 26.67 |
| 8h | -74.60 | 0.20 | | | 26.59 |
| 9h | 24.56 | 5.75 | 1.487 | 70.4 | 24.81 |
| 10h | -72.47 | 1.00 | 1.847 | 23.8 | 23.95 |
| 11h | 55.97 | 26.00 | | | 22.65 |
| 12h | -145.36 | 3.96 | 1.847 | 23.8 | 20.89 |
| 13h | -58.17 | 4.73 | | | 22.35 |
| 14h | -14.72 | 1.20 | 1.804 | 46.5 | 22.62 |
| 15h | -36.76 | 0.25 | | | 27.29 |
| 16h | 128.47 | 6.90 | 1.620 | 36.3 | 40.57 |
| 17h | -60.92 | 6.78 | | | 40.80 |

FIG. 25 (TABLE 16)

ZOOM LENS

CROSS-REFERENCE TO A RELATED APPLICATION

Reference is made to commonly assigned U.S. Pat. No. 4,757,372, entitled SLR ZOOM CAMERA.

BACKGROUND OF THE INVENTION

1. Field of the Invention

This invention relates to zoom taking lenses for photographic single lens reflex (SLR) cameras.

2. Description Relative to the Prior Art.

SLR cameras are known which include a camera body which supports photographic film in a film plane, a taking lens for imaging an object onto the film at the film plane, a shutter for controlling the flow of light to the film plane for determining the duration of the photographic exposure, and a viewfinder system for viewing the image which the lens would create on the film plane. The viewfinder system usually includes reflective means, in the form of a mirror, movable between a position in which it intercepts light rays which are directed by the taking lens towards the film plane and directs them laterally of the axis of the taking lens for viewing, and a position in which it is out of the way of the rays from the taking lens and allows those rays to approach the film plane. The first-mentioned position of the mirror may be termed its viewing position and the second-mentioned position may be termed its taking position.

In known camera and zoom lens combinations the mirror is behind the rearmost element of the lens. Such position of the mirror inevitably requires that the lens have a long back-focal-length. Additionally, the zooming motions must take place in front of the mirror. This restriction determines the first order properties of the system and usually results in large element diameters and/or lens length.

It is an object of the present invention to overcome the above restrictions.

SUMMARY OF THE INVENTION

In accordance with the present invention there is provided a zoom taking lens for a photographic SLR camera having viewfinder means, the lens having a front to be towards an object to be photographed and an axis. The lens includes a first unit of lens elements at the front of the lens and a moving second unit of lens elements. The second unit of lens elements includes an air space between elements of the unit. There are axially movable reflective means disposed in the air space and inclined to the axis of the lens. The reflective means serve to direct light received from the object through the first unit and through at least one element of the second unit, to the viewfinder means.

The present invention also resides in a zoom taking lens for a photographic SLR camera having a short focal length less than the diagonal dimension of the image created on the film plane of the camera by the lens, the lens having a front to be towards an object to be photographed and an axis. The lens includes a negative first lens element unit at the front of the lens and a positive second lens element unit including a positive first sub-unit and a negative second sub-unit. The first and second sub-units are separated by an air space sufficiently large to accommodate reflective means for directing light received from the object through the first unit and through at least one element of the second unit, laterally to viewfinder means. The first lens element unit has an air space, or air spaces, the length, or the sum of the lengths, of which is greater than 10% of the focal length at the short focal length extreme of the lens.

The present invention also resides in zoom taking lenses having parameters and characteristics as variously defined in Tables 1 to 16 contained in the ensuing description and the drawings associated therewith.

BRIEF DESCRIPTION OF THE DRAWINGS

Embodiments of the present invention will now be described, by way of example, with reference to the accompanying drawings, in which:

FIG. 7 is a table giving some parameters of the taking lens illustrated in FIGS. 1 to 6;

FIG. 10 is a Table 3, giving some of the parameters of the lens illustrated in FIGS. 8 and 9;

FIG. 13 is a Table, 5, giving some parameters of the lens illustrated in FIGS. 11 and 12;

FIG. 16 is a Table, 7, giving some parameters of the lens illustrated in FIGS. 14 and 15;

FIG. 19 is a Table, 9, of some parameters of the lens illustrated in FIGS. 17 and 18;

FIG. 20 is a Table, 11, similar to Tables 1, 3, 5, 7 and 9, but for a sixth embodiment of the invention;

FIG. 22 is a Table 13, giving some parameters of the lens illustrated in FIG. 21;

FIG. 25 is a Table, 16, giving some constructional parameters of the lens illustrated in FIGS. 23 and 24.

DETAILED DESCRIPTION OF THE PREFERRED EMBODIMENT

Figure 1:
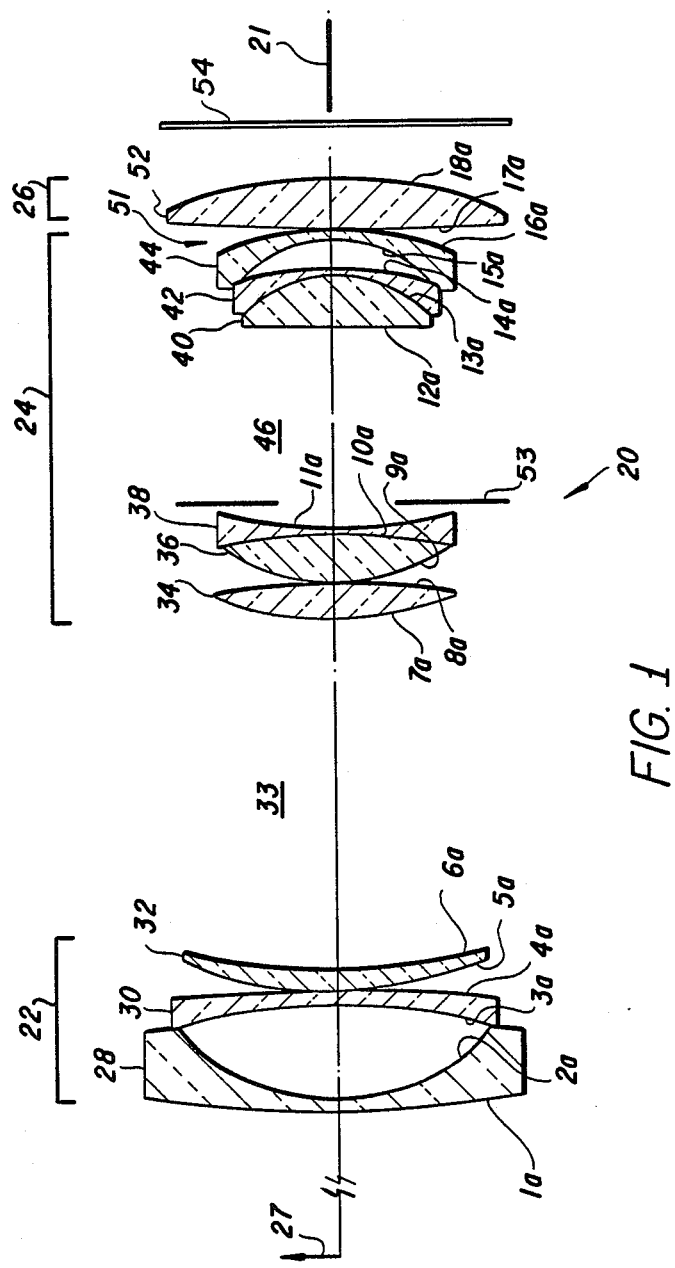
FIG. 1 is a diagram of a first embodiment of a lens in accordance with the present invention, in a short focal length condition.
Figure 2:
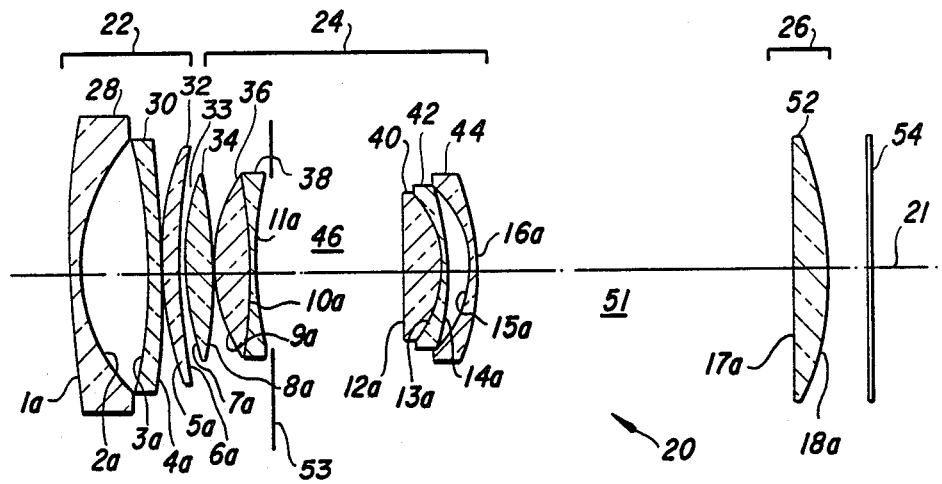
FIG. 2 is a diagram of the lens illustrated in FIG. 1 but in a long focal length condition.

The lens 20 represented in FIGS. 1 and 2 is a zoom lens intended for use in a photographic camera and has a focal length range of 29.3 to 116.0 mm. In FIG. 1 it is illustrated in the condition giving the former focal length and in FIG. 2 it is illustrated in the condition giving the latter focal length.

The lens 20 has an axis 21 and includes three units 22, 24, and 26 of lens elements. The unit 22 is at the front of the lens 20, that is, it is towards an object 27 to be photographed. The unit 22 moves both in zooming and for focussing. The unit 26 is at the rear of the lens and, in the present embodiment, does not move. The unit 24 is between the units 22 and 26 and moves in zooming.

The front first unit 22 is negative and includes three elements 28, 30 and 32. The element 28 is located on the object side of the lens (i.e. it is at the front of the lens) and is a negative meniscus. The element 30 is in the middle of the first unit and is a negative meniscus. The third element 32 is a positive meniscus.

The second unit 24 includes six elements 34, 36, 38, 40, 42 and 44 formed in two sub-units, i.e. a sub-unit of elements 34, 36 and 38 and a sub-unit of elements 40, 42 and 44. The elements 36 and 38 form a cemented doublet as do the elements 40 and 42. The element 34 is biconvex. The element 36 is biconvex and the element 38 is biconcave and together they form a meniscus.

Figure 4:
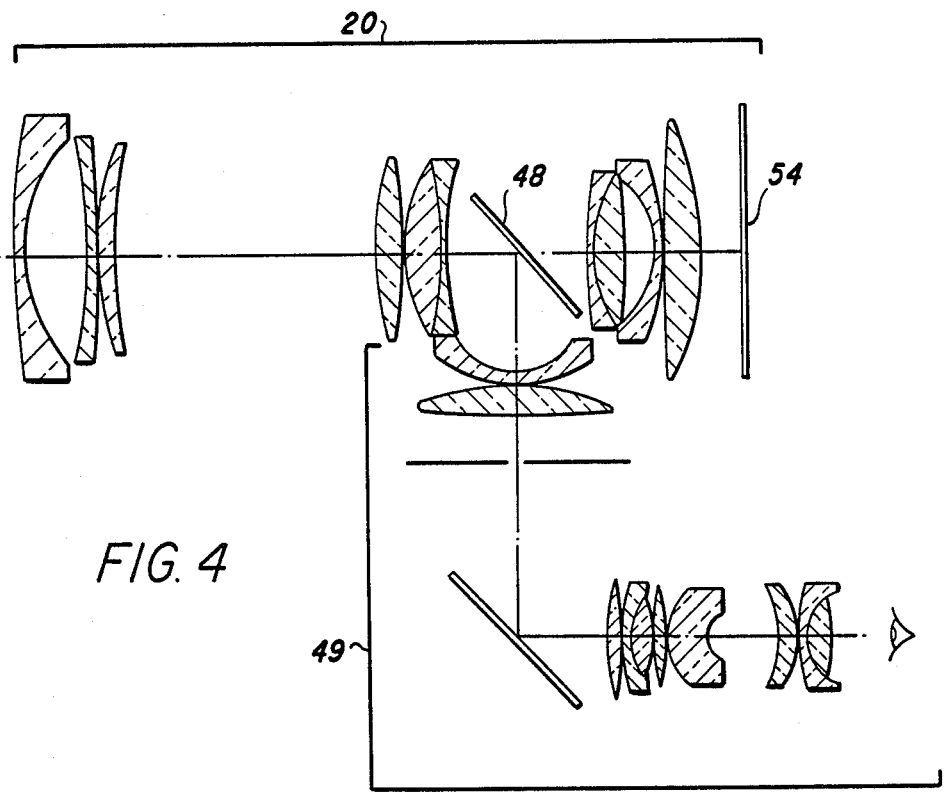
FIG. 4 is a diagram of the lens represented in FIGS. 1 to 4 together with viewfinder means, in a short focal length condition.
Figure 5:
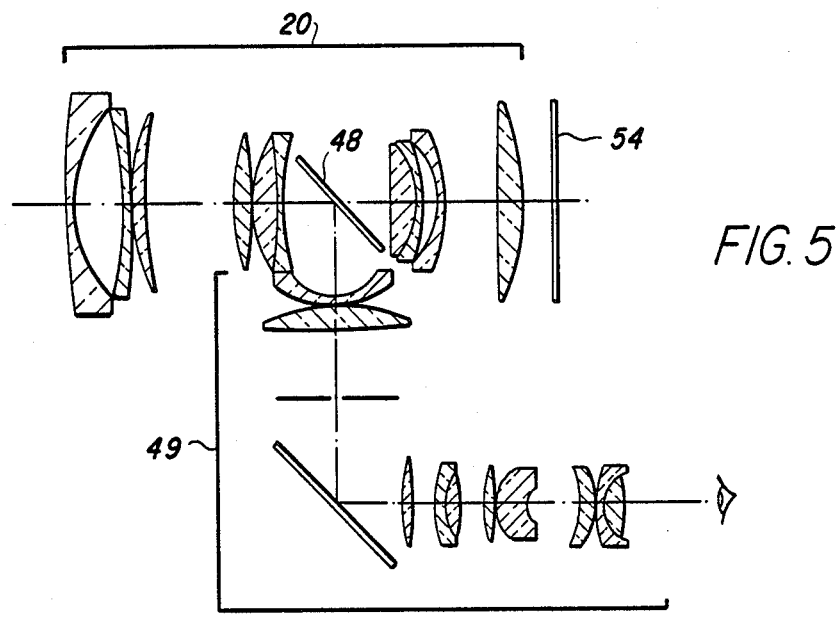
FIG. 5 is a diagram similar to FIG. 4 but in an intermediate focal length condition.
Figure 6:
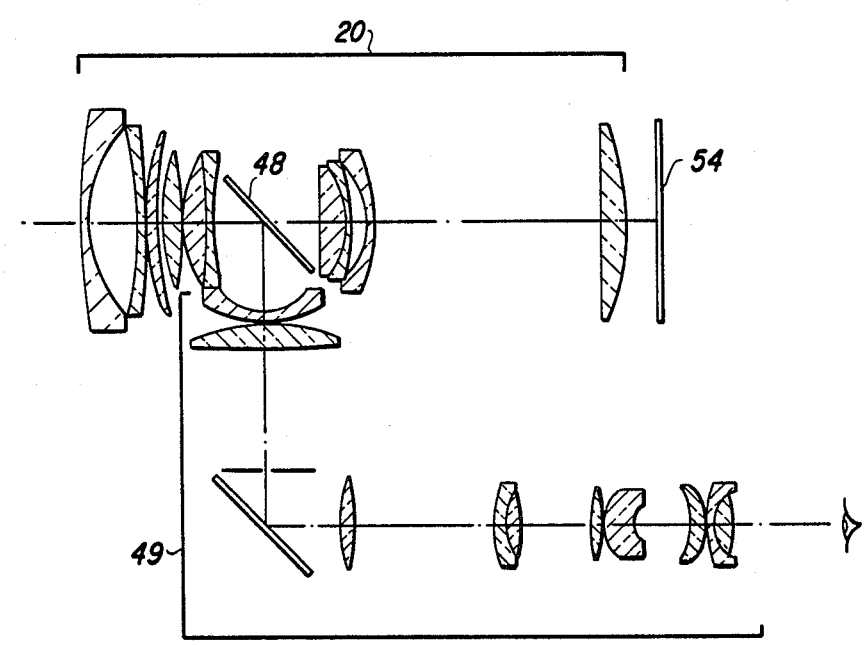
FIG. 6 is a diagram similar to FIGS. 4 and 5, but in a long focal length condition.

The element 40 is biconvex and the element 42 is a negative meniscus and together they form a negative doublet. The element 44 is a negative meniscus. There is an air space 46 between the elements 38 and 40. The air space 46 has an axial length which is sufficiently large that the air space 46 can accommodate reflective means, in the form of a mirror 48, which serves a purpose similar to that performed by the movable mirror of a conventional SLR camera, namely to direct, to a viewfinder system, light rays from the object being photographed and which have passed through the taking lens. A SLR camera has the advantage that the eye of the photographer can see exactly the image that will be created on the film, for example, there is an avoidance of parallax problems, and the framing and focus condition are exactly presented to the photographer. In FIGS. 4 to 6, the viewfinder system is indicated by the reference numeral 49. In a conventional SLR camera the mirror is located between the rearmost element of the taking lens and the film plane. Such a position of the mirror requires that the taking lens has a large back focal length. A lens in accordance with the present invention, by providing a large air space between elements of the lens, allows the mirror to be disposed within the length of the lens and hence allows the zooming elements of the lens to be closer to the film plane than is possible in a conventional SLR camera and allows the insertion of a field flattening lens. This is apparent in FIGS. 4 to 6 which show the taking lens 20, mirror 48 and viewfinder system 49 in three different conditions including the extreme short focal length and maximum focal length positions. As can be seen in FIGS. 4 to 6, the mirror is movable along the axis of the lens in coordination with the corresponding movement of an adjacent lens element so that the mirror and the lens element occupy the same location during different stages of zooming.

Figure 3:
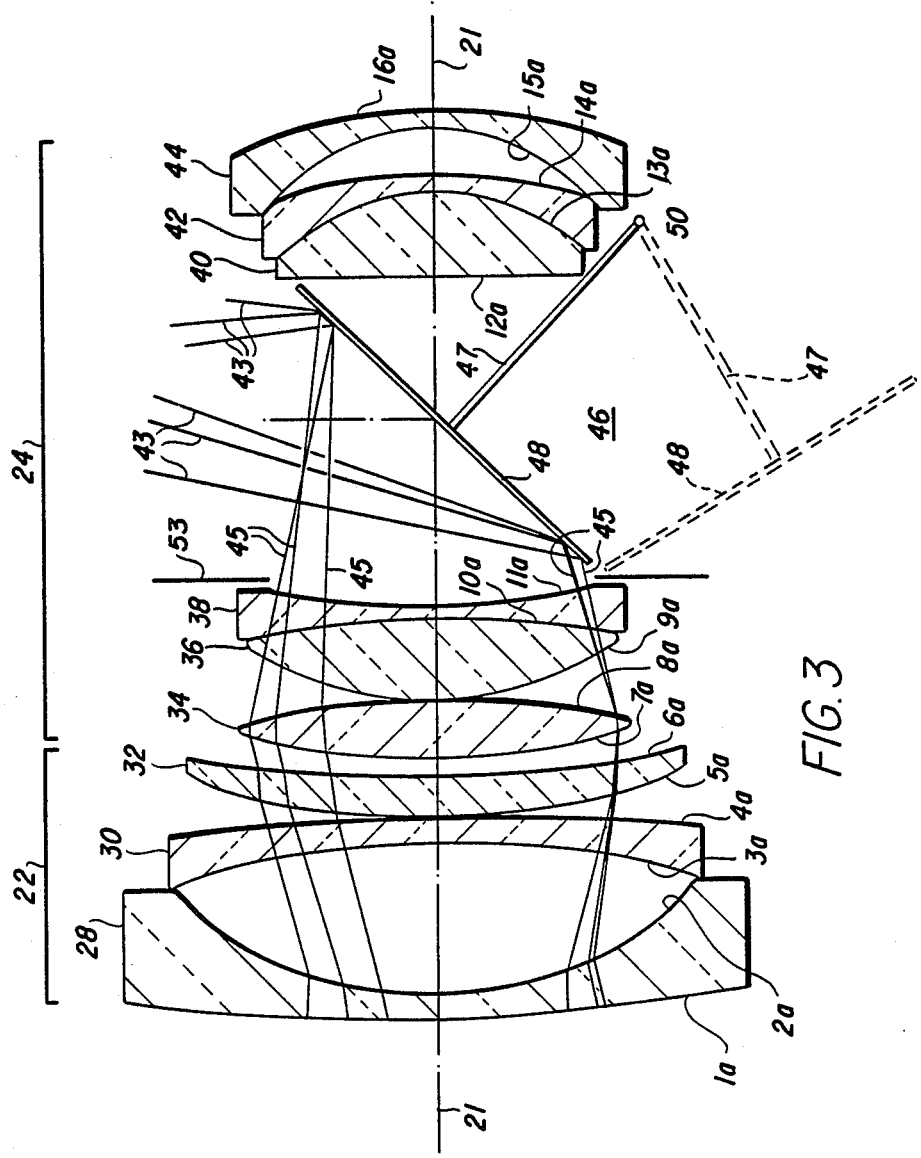
FIG. 3 is an enlarged portion of FIG. 2 additionally showing reflective means, in a viewing condition, for directing rays into a viewfinder system.

FIG. 3 illustrates the front and second lens units 22 and 24 on an enlarged scale and in their positions for maximum focal length of the lens 20. The mirror 48 is shown supported on an arm 47 for pivotal movement about a pivot 50. The pivot 50 for the mirror 48 is integral with the mount (not shown) for the second lens unit 24 so that the mirror moves with the second lens unit during zooming. The mirror is shown in solid line in its viewing position and in broken line in its taking position. In its viewing position, the mirror 48 is disposed at an angle (45° in the present embodiment) such that the incident rays 45 arriving from the lens element 38 are reflected, as rays 43, laterally of the axis 21, out from between the lens elements 38 and 40 into the viewfinder system, which is not shown in FIG. 3 but is shown in FIGS. 4, 5 and 6. The viewfinder forms part of an SLR Zoom Camera which is described and claimed in U.S. Pat. No. 4,757,372, filed on the same day as the present application in the names of Ellis I. Betensky, Melvyn H. Kreitzer and Jacob Moskovich, the disclosure of which is specifically incorporated herein by reference.

The mirror 48 is of such a size that with all possible focal lengths of the lens, i.e. with all possible shapes of the bundles of rays 45 in the air space 46 between the lens elements 38 and 40, all of the rays 45 are intercepted by the mirror 48. The size of the mirror 48 and its inclination to the axis 21 determine the length of the air space 46 and when it is said in this specification that the air space is large it is meant that the air space is large enough to accommodate reflective means which are inclined to the axis and which intercept all light rays and which direct light received from the object through the first unit and through at least one element of the second unit, to viewfinder means.

The third lens unit 26, which is rearmost, contains a single lens element 52 and is stationary. The element 52 has overall convergent optical power, is biconvex and provides field flattening so that the image is planar and on the film plane 54. The air space between the units 24 and 26 is referenced 51 and is, of course, variable.

The first lens unit 22 is negative; the second lens unit 24 is positive; and the third lens unit 26 is positive.

The surfaces of the lens elements are referenced 1a through 18a. As is customary, contacting surfaces of a doublet are given the same reference numeral.

Various constructional parameters of the lens, when in its short focal length condition, are given in Table 1 which forms FIG. 7. All dimensions throughout this specification are in millimeters unless otherwise stated.

There is an aperture stop 53 located in near proximity to surface 11a.

The spaces between elements 32 and 34, i.e. air space 33, and between elements 44 and 52, i.e. the air space 51, vary during zooming and some values are:

TABLE 2

| EFFECTIVE FOCAL LENGTH | AIR SPACE 33 | AIR SPACE 51 |
| --- | --- | --- |
| 29.30 | 43.34 | 0.25 |
| 50.00 | 19.32 | 12.20 |
| 85.00 | 5.91 | 32.49 |

TABLE 2-continued

| EFFECTIVE FOCAL LENGTH | AIR SPACE 33 | AIR SPACE 51 |
| --- | --- | --- |
| 116.00 | 0.89 | 50.66 |

It will be observed from Table 1 that the air space between surfaces 2a and 3a is 11.06 mm. and is greater than 10% of the short focal length extreme of the zoom lens, i.e. the 29.30 mm. focal length condition in Table 2.

In the above description of the first embodiment and in the drawings thereof, as elsewhere in this specification, the lens is understood to be focussed at infinity.

Figure 8:
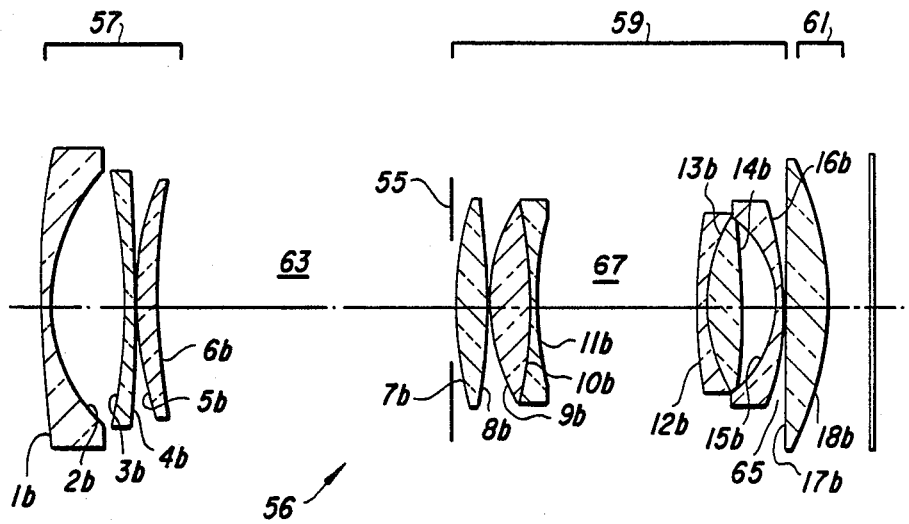
FIG. 8 is a diagram illustrating a lens in accordance with a second embodiment of the present invention, in a short focal length condition.
Figure 9:
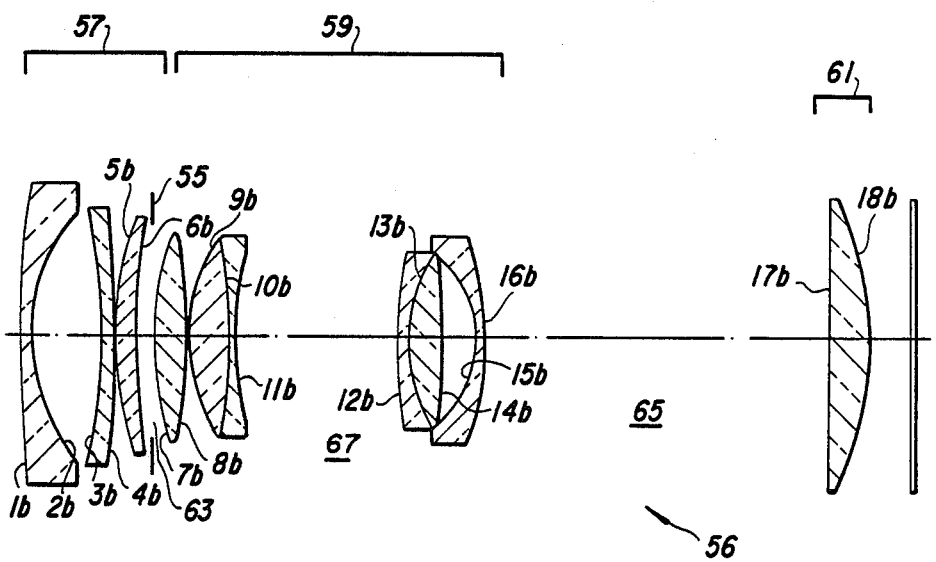
FIG. 9 is a diagram of the lens illustrated in FIG. 8, in a long focal length condition.

A lens 56 in accordance with a second embodiment of the present invention is illustrated in FIGS. 8 and 9. This lens 56 also includes three units 57, 59 and 61 with the front unit 57 moving for zooming and focussing and the second unit 59 moving for zooming. The third unit 61 is stationary.

The ten elements of the lens 56 are constructed identically in type and in formation into doublets and units, as the ten elements of the first embodiment and there will not be further description in this respect.

The lens includes a large air space 67 in the second unit which, in accordance with the present invention, is large enough, 23.5 mm., to accommodate reflective means as described above in relation to the first herein described embodiment. Various constructional parameters of the lens represented in FIGS. 8 and 9 are given in Table 3 in FIG. 10.

There is an aperture stop 55 which is located in near proximity to surface 7b. The aperture stop has a variable aperture.

There are air spaces 63 and 65 between the units 57 and 59 and between the units 59 and 61, respectively, which vary during zooming and the thicknesses of these air spaces 63 and 65 at various effective focal lengths are as follow:

TABLE 4

| EFFECTIVE FOCAL LENGTH | AIR SPACE 63 | AIR SPACE 65 |
| --- | --- | --- |
| 29.30 | 43.28 | 0.25 |
| 50.00 | 20.74 | 12.10 |
| 84.99 | 7.62 | 32.22 |
| 115.99 | 2.70 | 50.20 |

It will be understood from Table 3 that the air space between surfaces 2b and 3b is 10.32 mm. and is greater than 10% of the short focal length extreme of the zoom lens, i.e. the 29.30 focal length condition in Table 4.

Figure 11:
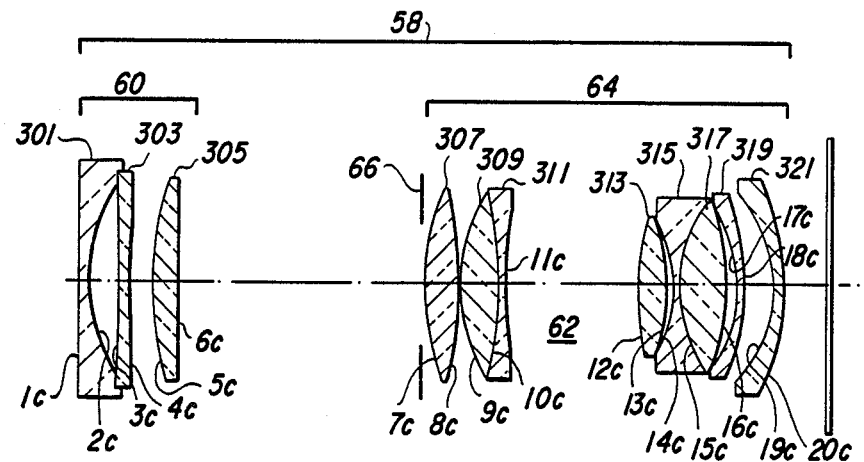
FIG. 11 is a diagram of a lens in accordance with a third embodiment of the present invention, in a short focal length condition.
Figure 12:
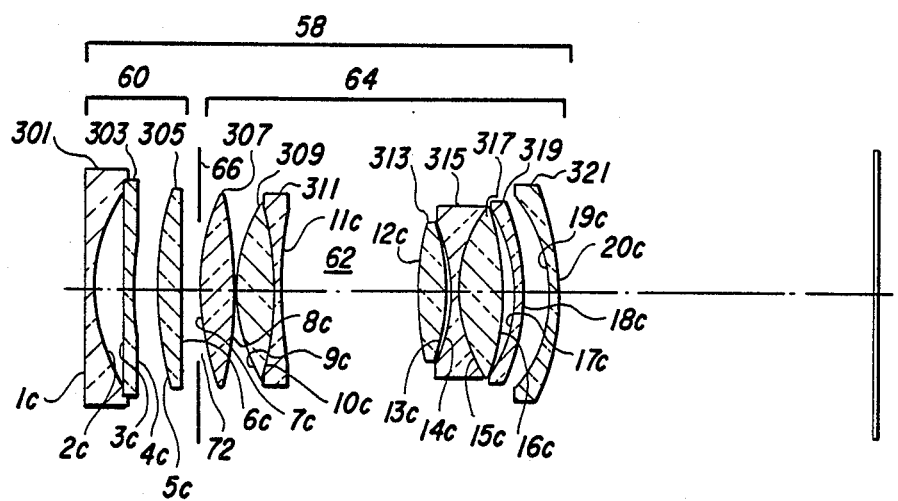
FIG. 12 is a diagram of the lens illustrated in FIG. 11, in a long focal length condition.

A lens 58 in accordance with a third embodiment is illustrated in FIGS. 11 and 12 and some of its constructional parameters are included in Table 5 which constitutes FIG. 13. The lens 58 includes two units 60 and 64 of lens elements. The front unit 60 moves for zooming and for focussing and the second unit 64 moves for zooming. The second unit includes a large air space 62, in accordance with the present invention, which is large enough for receiving reflective means similar in purpose to the mirror 48 of the first above-described embodiment. The size of the air space is given in Table 6 below.

The first unit 60 of lens elements includes a positive meniscus element 301 at the front of the lens. The next element is a biconcave element 303 and the third element is a positive meniscus element 305.

The second unit 64 of elements includes eight elements arranged three ahead of the large air space 62 and five behind the air space 62. The first element of the second unit 63 is a biconvex element 307. The second and third elements 309 and 311 are a cemented meniscus doublet. The element 309 is biconvex and the element 311 is biconcave. After the air space 62 there is the fourth element 313 in the second unit, which is biconvex. The fifth and sixth elements 315 and 317 in the second unit are a cemented doublet. The element 315 is biconcave and the element 317 is biconvex. The seventh element 319 in the second unit, i.e. the fourth element after the air space 62, is a negative meniscus. The final element 321 in the second unit, which is at the back of the lens, is a negative meniscus.

In this third embodiment there is a variable aperture stop 66 located in near proximity to the surface 7c. Table 6 gives the length of the air space 62 for various effective focal lengths including the two focal length extremes.

TABLE 6

| EFFECTIVE FOCAL LENGTH | AIR SPACE 62 |
| --- | --- |
| 29.30 | 36.03 |
| 50.00 | 16.53 |
| 85.01 | 5.17 |
| 101.02 | 2.60 |

It will be observed from Table 5 that the sum of the lengths of the air spaces between surfaces 2c and 3c and between surfaces 4c and 5c is 7.77 mm. and is greater than 10% of the short focal length extreme of the zoom lens, i.e. the 29.30 mm. focal length condition in Table 6.

Figure 14:
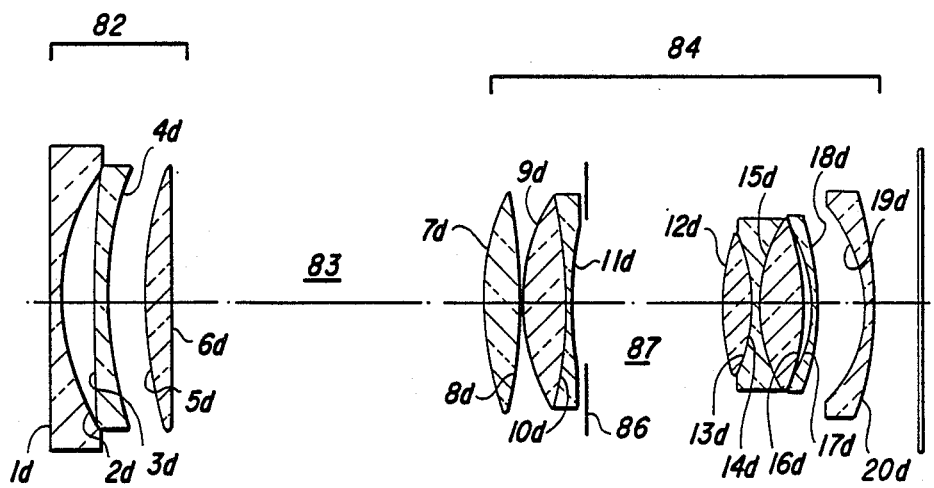
FIG. 14 is a diagram illustrating a lens which is a fourth embodiment of the present invention, in a short focal length condition.
Figure 15:
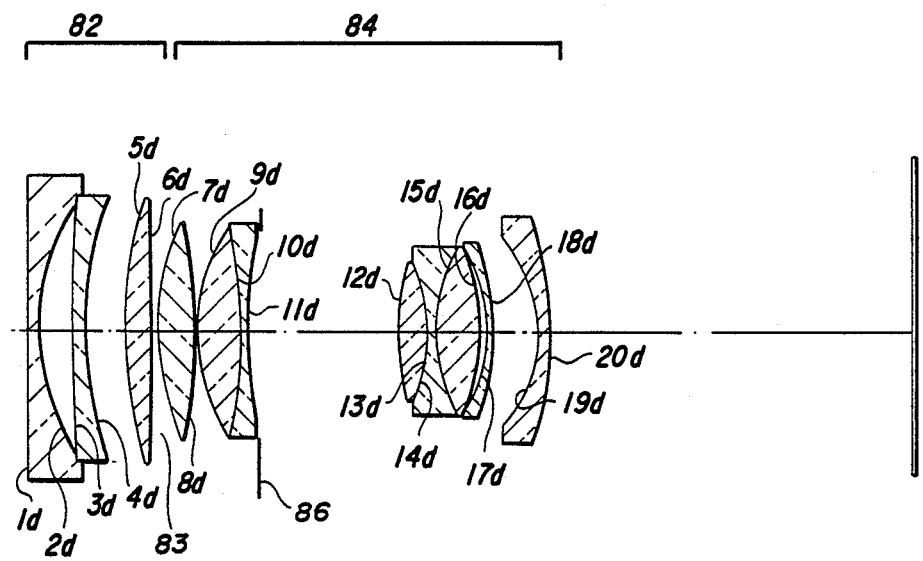
FIG. 15 is a diagram illustrating the lens illustrated in FIG. 14, in a long focal length condition.

A fourth embodiment of the invention is illustrated in FIGS. 14 and 15. Like the third embodiment, it includes two units 82 and 84 of lens elements both of which are movable for zooming and the front one of which is movable also for focussing. The air space between the two units 82 and 84 of lens elements is referenced 83 in FIGS. 14 and 15. There is a large air space 87, in accordance with the present invention, in the second lens unit 84 between surfaces 11d and 12d.

In the fourth embodiment there are eleven lens elements arranged in two units as in the third embodiment. The elements in the fourth embodiment are of the same types and sequence and are arranged in doublets and units in the same manner as the elements in the third embodiment and reference is made to the description of the third embodiment.

Some of the lens constructional parameters are given in Table 7 which constitutes FIG. 16. The length of the air space at various focal lengths, including the two focal length extremes, is given in Table 8 below. There is a variable aperture stop 86 which is in near proximity to the surface 11d.

TABLE 8

| EFFECTIVE FOCAL LENGTH | AIR SPACE 83 |
| --- | --- |
| 29.30 | 45.14 |
| 50.00 | 20.51 |
| 85.01 | 6.16 |
| 116.01 | 0.68 |

It will be observed from Table 7 that the sum of the lengths of the air spaces between surfaces 2d and 3d and between surfaces 4d and 5d is 10.22 mm. and is greater than 10% of the short focal length extreme of the zoom lens, i.e. the 29.30 mm. focal length condition in Table 8.

Figure 17:
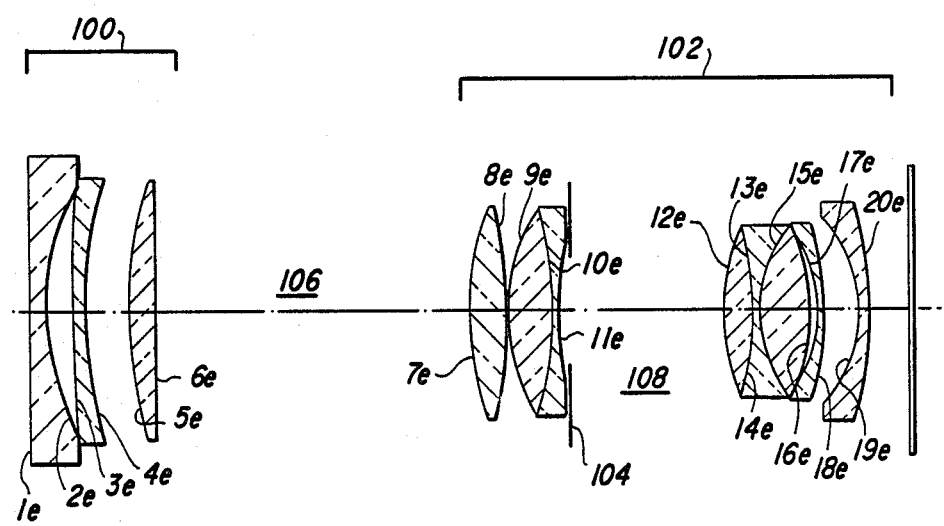
FIG. 17 is a diagram illustrating a lens which is a fifth embodiment of the present invention, in a short focal length condition.
Figure 18:
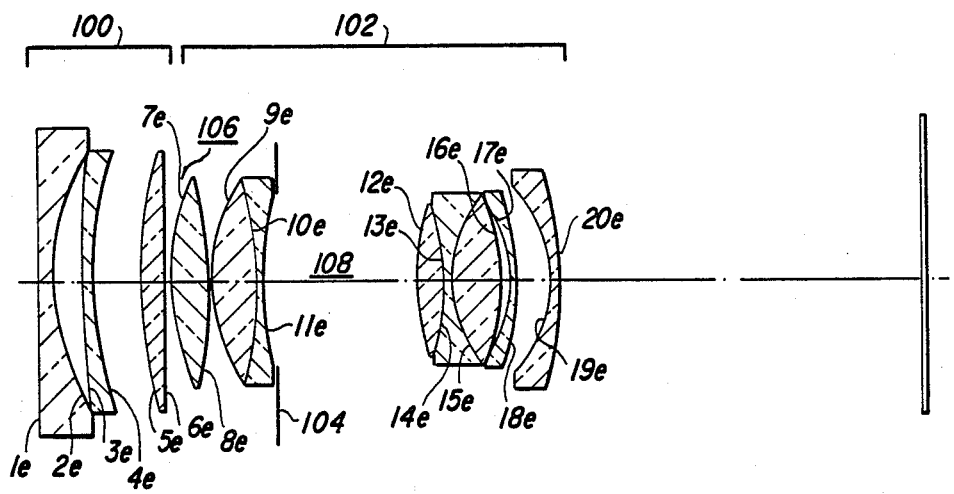
FIG. 18 is a diagram of the lens illustrated in FIG. 17, but in a long focal length condition.

A lens in accordance with a fifth embodiment of the invention is illustrated in FIGS. 17 and 18. Like the third and fourth embodiments, this fifth embodiment includes two lens units 100 and 102, both of which are movable for zooming and the front unit 100 of which is movable also for focussing. The fifth embodiment includes a large air space 108 in the second unit 102 of lens elements. In this embodiment, the large air space 108, intended to accommodate the reflective means, does not have a fixed dimension but like the air space 106 between the units 100 and 102, it is variable in length. There is a variable aperture stop 104 which is in near proximity to the surface 11e.

The eleven lens elements in the fifth embodiment are of the same type and are in the same sequence as the eleven lens elements in each of the third and fourth embodiments and they are formed into doublets and are arranged in units in the same manner as in the third and fourth embodiments, and reference is made to the descriptions of the third and fourth embodiments.

Some of the constructional parameters of the lens illustrated in FIGS. 17 and 18 are given in Table 9 which forms FIG. 19. The lengths of the two air spaces 106 and 108 are given in the following Table 10 for various focal lengths, including the two focal length extremes.

TABLE 10

| EFFECTIVE FOCAL LENGTH | AIR SPACE 106 | AIR SPACE 108 |
| --- | --- | --- |
| 29.30 | 46.22 | 24.14 |
| 50.00 | 21.30 | 23.11 |
| 85.00 | 6.38 | 22.53 |
| 116.00 | 0.68 | 22.20 |

It will be observed from Table 9 that the sum of the lengths of the air spaces between the surfaces 2e and 3e and between surfaces 4e and 5e is 12.43 mm. and is greater than 10% of the short focal length extreme of the zoom lens, i.e. the 29.30 mm. focal length condition in Table 10.

In that the large air space in the second unit 102 of lens elements is variable in length, it is to be understood that even in the condition of the lens which makes the length of the air space 106 the shortest, which is the extreme long focal length condition in the present embodiment, there is space enough for the reflective means. Thus, the present invention is to be understood as including lenses in which the air space for accommodating the reflective means is variable in length, but which in its shortest length is long enough to accommodate reflective means.

A sixth embodiment of the present invention is generally similar in structure to the first embodiment described above with reference to FIGS. 1 to 7, but has different surface radii and other parameters. The surface radii, element and air space (designated 33' and 51' to correspond to spaces 33 and 51 in the first described embodiment) thicknesses and element materials are given in Table 11 which is FIG. 20. The lengths of the variable air spaces 33' and 51', at various effective focal lengths of the lens are as follows:

TABLE 12

| EFFECTIVE FOCAL LENGTH | AIR SPACE 33' | AIR SPACE 51' |
| --- | --- | --- |
| 29.30 | 41.67 | 0.25 |
| 50.00 | 19.01 | 12.15 |
| 85.00 | 5.84 | 32.42 |
| 116.02 | 0.89 | 50.48 |

It will be observed from Table 11 that the air space between surfaces 2f and 3f is 10.91 mm. long and is greater than 10% of the short focal length extreme of the zoom lens, i.e. the 29.30 mm. focal length condition in Table 12.

In this sixth embodiment, the aperture stop, similar to aperture stop 53, is located in near proximity to the surface 11f corresponding to surface 11a.

It will be observed from a review of Tables 1 and 11 that the large air space for accommodating the reflective means is 2 mm. longer in the sixth embodiment than in the first embodiment which is advantageous as providing additional space for the viewfinder system, such as system 49 in FIGS. 4, 5 and 6.

Figure 21:
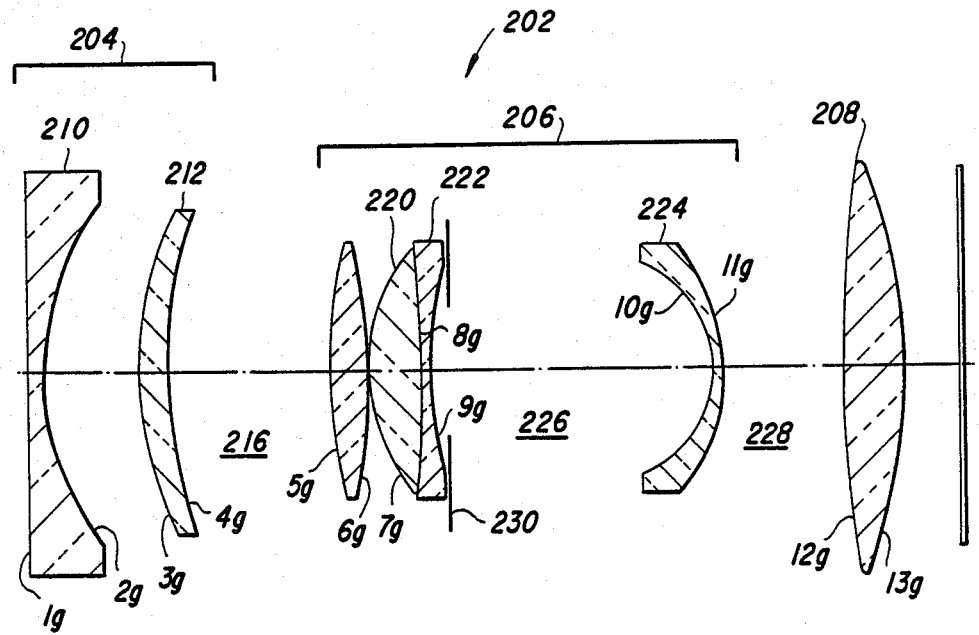
FIG. 21 is a diagram illustrating a lens which is a seventh embodiment of the present invention, in a intermediate focal length condition.

A seventh embodiment of the present invention is represented in FIG. 21 which shows a lens 202 which includes a first lens element unit 204 at the front of the lens, a second lens element unit 206 and a field flattening element 208.

The first lens unit 204 includes two elements 210 and 212. The front element 210 is a negative meniscus. The second lens element 212 in the first lens unit is a positive meniscus. There is a variable air pace 216 between the first and second units 204 and 206. The second unit 206 includes four lens elements 218, 220, 222 and 224. The front element 218 of the second unit is biconvex. The second and third elements 220 and 222 are formed as a doublet and are, respectively, biconvex and a negative meniscus. The fourth element 224 of the second unit is negative meniscus. There is a large air gap 226, in accordance with the present invention, between the third and fourth elements of the second unit 206.

The field flattening element 208 is separated form the second unit 206 by a variable air space referenced 228 in FIG. 21.

The second unit 206 moves for zoomimg and the first element 204 moves for zooming and focus compensation.

Table 13, which forms FIG. 22 gives the radii of the surfaces 1g to 13g of the elements of the lens 202; the thicknesses of the air spaces; characteristics of the materials of the elements; and the clear apertures of the elements. Table 13, which follows gives the lengths of the air spaces for various effective focal lengths, including the two focal length extremes, of the lens.

TABLE 14

| EFFECTIVE FOCAL LENGTH | AIR SPACE 216 | AIR SPACE 228 |
| --- | --- | --- |
| 29.30 | 38.34 | 0.25 |
| 50.00 | 17.51 | 12.86 |
| 85.00 | 5.44 | 32.33 |
| 116.01 | 0.89 | 53.27 |

There is a variable aperture stop 230 located in near proximity to surface 9g.

It will be observed from Table 13 that the air space between surfaces 2g and 3g, i.e. the air space between the two elements 210 and 212 of the first unit 204, is 10.56 mm. which is more than 10% of the short focal length extreme of the zoom lens, i.e. the 29.30 mm. focal length in Table 13.

Figure 23:
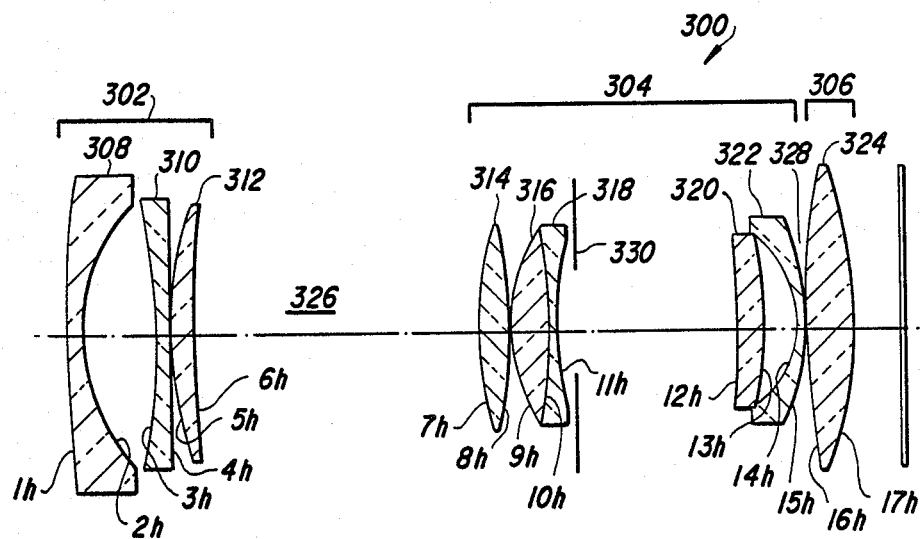
FIG. 23 is a diagram illustrating a lens which is an eighth embodiment of the present invention, in a short focal length condition.
Figure 24:
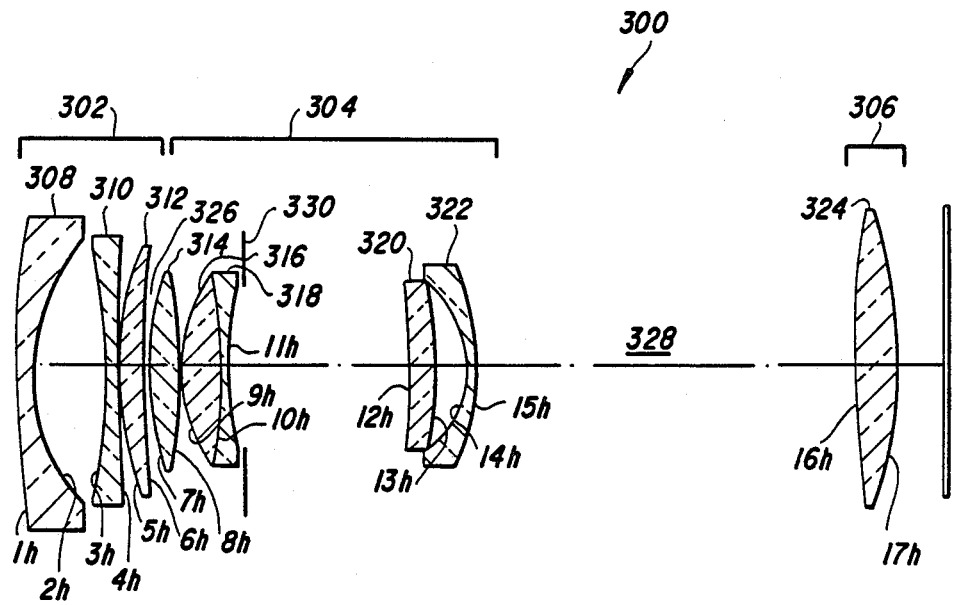
FIG. 24 is a diagram of the lens illustrated in FIG. 23 but in a long focal length condition.

An eighth embodiment of the present invention is illustrated in FIGS. 23 and 24. The lens 300 illustrated in FIGS. 23 and 24 includes a first unit 302 at the front of the lens, a second unit 304 and a third unit 306. The first unit 302 is moveable for zooming and focussing, the second unit 304 is moveable for zooming and the third unit 306 is fixed.

The first unit 302 includes a first element 308 which is a positive meniscus, a second element 310 which is a negative meniscus, and a third element 312 which is a positive meniscus.

The second unit 304 includes a biconvex element 314 and a doublet formed of a biconvex element 316 and a negative meniscus element 318. The elements 314, 316 and 318 form a first sub-unit which is separated from a second sub-unit by a large air space, in accordance with the present invention. The second sub-unit includes an element 320 which is a positive meniscus and an element 322 which is a negative meniscus.

The third unit 306 includes a single element 324 which is biconvex and flattens the field.

There is a variable air space 326 between the first and second units and a variable air space 328 between the second and third units. The lengths of the variable air spaces 326 and 328 are given in Table 15 below.

TABLE 15

| EFFECTIVE FOCAL LENGTH | AIR SPACE 326 | AIR SPACE 328 |
| --- | --- | --- |
| 29.29 | 41.11 | 0.25 |
| 49.99 | 18.75 | 13.08 |
| 85.01 | 5.77 | 34.91 |
| 116.06 | 0.90 | 54.29 |

There is a variable aperture stop 330 in near proximity behind the element 318 of the first sub-unit of the second unit.

Various constructional parameters of the lens 300, when in short focal length condition, are given in Table 16 which forms FIG. 25.

It will be understood from Table 16 that the air space between surfaces 2h and 3h is 10.57 mm. long and is greater than 10% of the short focal length extreme, i.e. the 29.29 mm. focal length condition in Table 15.

It will be observed from the ensueing Table 17 that the ratio of the absolute value of the focal length of the first unit to the focal length of the second unit, lies within the range of 1.4:1 to 2.8:1, for all of the embodiments herein described.

TABLE 17

| EMBODIMENT FIGS. | ABSOLUTE VALUE OF FOCAL LENGTH OF 1st UNIT | FOCAL LENGTH OF 2nd UNIT | RATIO |
| --- | --- | --- | --- |
| 1-7 | 57.442 | 30.716 | 1.87:1 |
| 8-10 | 57.452 | 30.261 | 1.9:1 |
| 11-13 | 50.123 | 27.525 | 1.82:1 |
| 14-16 | 57.082 | 30.526 | 1.87:1 |
| 17-19 | 60.002 | 40.287 | 1.49:1 |
| 20 | 57.468 | 30.421 | 1.89:1 |
| 21,22 | 57.819 | 29.999 | 1.93:1 |
| 23-25 | 57.542 | 31.344 | 1.84:1 |

It will be observed that all of the described embodiments of the invention have a short focal length which is less than the diagonal measurement, 43.27 mm., of a 35 mm. photographic image.

In the embodiments of the invention described above, all of the lens elements are spherical. It is to be understood that one or more aspheric surfaces may be used in embodiments of the present invention and the invention is to be understood as including embodiments in which an aspheric surface or aspheric surfaces are used.

While the reflective means, in the form of mirror 48, has been illustrated only in FIGS. 3 to 6, which are some of the Figures illustrating the first embodiment of the present invention herein described, it is to be understood that the other embodiments herein described also have reflective means in the large air space in the second lens element unit, when intended for use with SLR cameras. The reflective means are omitted from all Figures other than FIGS. 3 to 6 to avoid overcrowding the Figures and thereby aid understanding. The lenses herein described but without reflective means in the large air space in the second lens element unit are regarded as part of the present invention.

Reflective means other than the mirror arrangement described with reference to and illustrated in FIGS. 3 to 6 may be used. For example, mirrors movable into and out of the air space in manners other than that specifically illustrated may be adopted. Also, reflective means which are permanently in the air space may be used, such as half silvered mirrors and other forms of beam splitters.

The invention has been described in detail with particular reference to presently preferred embodiments, but it will be understood that variations and modifications can be effected within the spirit and scope of the invention.

What is claimed is:

1. A zoom taking lens for a photographic SLR camera having viewfinder means, said lens having a front to be towards an object to be photographed and an axis and including:
   a first unit of lens elements at the front of the lens;
   and a moving second unit of lens elements including an air space between elements of the unit; and
   axially movable reflective means disposed in said air space and inclined to the axis of the lens, for directing light, received from the object through said first unit and through at least one element of the second unit, to the viewfinder means.

2. A zoom taking lens as claimed in claim 1, including:
   a third lens element unit behind said second unit.

3. A zoom taking lens as claimed in claim 2, wherein:
   said first lens unit includes a negative meniscus element having surfaces 1g and 2g and a positive meniscus element having surfaces 3g and 4g;
   said second lens unit includes first and second lens element sub-units with said air space being between said sub-units, said first sub-unit including a biconvex element having surfaces 5g and 6g and a biconvex element having surfaces 7g and 8g and a negative meniscus element having surfaces 8g and 9g forming a doublet, and the second sub-unit includes a negative meniscus element having surfaces 10g and 11g; and
   the third lens element unit is a field flattening element having surfaces 12g and 13g.

4. A zoom taking lens as claimed in claim 3, wherein:
   said surfaces have the radii as follows:

| SURFACE NO. | RADIUS |
|---|---|
| 1 g | 2134.57 |
| 2 g | 30.07 |
| 3 g | 38.80 |
| 4 g | 54.57 |
| 5 g | 55.73 |
| 6 g | −70.12 |
| 7 g | 20.67 |
| 8 g | −117.34 |
| 9 g | 48.71 |
| 10 g | −12.17 |
| 11 g | −20.92 |
| 12 g | 126.28 |
| 13 g | −62.59 |

5. A zoom taking lens as claimed in claim 2, wherein said third unit includes a single lens element.

6. A zoom taking lens as claimed in claim 2 or 5, wherein said third unit of lens elements is fixed.

7. A zoom taking lens as claimed in claim 1, wherein said first unit is movable also.

8. A zoom taking lens as claimed in claim 1, wherein said air space in said second unit of lens elements is of fixed length.

9. A zoom taking lens as claimed in claim 1, wherein said air space in said second unit of lens elements is variable in length.

10. A zoom taking lens as claimed in claim 1, wherein:
said first unit of lens elements is negative; and
said second unit of lens elements is positive.

11. A zoom taking lens as claimed in claim 10, wherein:
said first lens unit includes an air space, or air spaces, the length, or sum of the lengths, of which is greater than 10% of the focal length of the zoom lens in its extreme short focal length condition.

12. A zoom taking lens as claimed in claim 10, wherein:
said first unit consists of meniscus elements.

13. A zoom taking lens as claimed in claim 10, wherein:
said second unit of lens elements includes a positive first sub-unit, including a negative element, to one side of said air space and a negative second sub-unit to the other side of said air space.

14. A zoom taking lens as claimed in claim 13, wherein:
said second sub-unit includes a negative meniscus element.

15. A zoom taking lens as claimed in claim 12, wherein:
said first sub-unit includes three elements including a biconvex element and a doublet, formed of a biconvex element and a biconcave element.

16. A zoom taking lens as claimed in claim 10, wherein:
said second unit of lens elements includes a first sub-unit and a second sub-unit, said first sub-unit including a biconvex element and a doublet, formed of a biconvex element and a biconcave element, and said second sub-unit includes a doublet, including a positive meniscus and a biconvex element, a biconvex element and a negative meniscus element.

17. A zoom taking lens as claimed in claim 10, including;
a third lens element unit; and wherein:
said third unit includes an element having overall convergent optical power.

18. A zoom taking lens as claimed in claim 10, including:
a third lens element unit.

19. A zoom taking lens as claimed in claim 10, wherein:
said first unit of lens elements includes a first negative meniscus element having surfaces 1a and 2a, a second negative meniscus element having surfaces 3a and 4a, and a third positive meniscus element having surfaces 5a and 6a;
said second unit of lens elements includes a first sub-unit including a biconvex element having surfaces 7a and 8a, and a doublet including a biconvex element having surfaces 9a and 10a, and a biconcave element having surfaces 10a and 11a, and a second sub-unit including a doublet including a positive meniscus having surfaces 12a and 13a, and a negative meniscus having surfaces 13a and 14a, and a negative meniscus element having surfaces 15a and 16a;
said third unit includes an element having overall convergent optical power having surfaces 17a and 18a; and
the radii of the surfaces, the thicknesses of the elements and the refractive indices and Abbeé V Numbers of the elements being as follows:

| SURFACE NO. | RADIUS | THICK-NESS | RE-FRACTIVE INDEX d | Abbe V NUMBER |
|---|---|---|---|---|
| 1a | 136.35 | 1.80 | 1.773 | 49.6 |
| 2a | 26.31 | 11.06 | | |
| 3a | −72.81 | 1.78 | 1.487 | 70.4 |
| 4a | −234.33 | 0.10 | | |
| 5a | 47.70 | 3.04 | 1.847 | 23.8 |
| 6a | 99.09 | 50.02 | | |
| 7a | 42.53 | 4.35 | 1.694 | 53.3 |
| 8a | −79.82 | 0.20 | | |
| 9a | 24.54 | 5.65 | 1.487 | 70.4 |
| 10a | −78.48 | 1.00 | 1.847 | 23.8 |
| 11a | 58.17 | 24.00 | | |
| 12a | −26243.13 | 6.00 | 1.593 | 35.3 |
| 13a | −16.34 | 1.04 | 1.804 | 46.5 |
| 14a | −42.83 | 3.65 | | |
| 15a | −15.01 | 1.20 | 1.773 | 49.6 |
| 16a | −37.33 | 0.25 | | |
| 17a | 675.43 | 6.00 | 1.522 | 59.5 |
| 18a | −50.95 | 6.50 | | | and the air space 33 between the first and second units of lens elements and the air space 51 between the second and third units of lens elements have lengths as follow at respective effective focal lengths:

| EFFECTIVE FOCAL LENGTH | AIR SPACE 33 | AIR SPACE 51 |
|---|---|---|
| 29.30 | 43.34 | 0.25 |
| 50.00 | 19.32 | 12.20 |
| 85.00 | 5.91 | 32.49 |
| 116.00 | 0.89 | 50.66 |

20. A zoom taking lens as claimed in claim 18, wherein:
said first unit of lens elements includes a first negative meniscus element having surfaces 1b and 2b, a second negative meniscus element having surfaces 3b and 4b, and a third positive meniscus element having surfaces 5b and 6b;

said second unit of lens elements includes a first subunit including a biconvex element having surfaces 7b and 8b, and a doublet including a biconvex element having surfaces 9b and 10b, and a biconcave element having surfaces 10b and 11b, and a second sub-unit including a doublet including a positive meniscus having surfaces 12b and 13b, and a negative meniscus having surfaces 13b and 14b, and a negative meniscus element having surfaces 15b and 16b;

said third unit includes an element having overall convergent optical power and having surfaces 17b and 18b; and the radii of the surfaces, the thicknesses of the elements and the refractive indices and Abbé V numbers of the elements being as follows:

| SURFACE NO. | RADIUS | THICK-NESS | RE-FRACTIVE INDEX d | Abbe V NUMBER |
|---|---|---|---|---|
| 1b | 150.63 | 1.80 | 1.773 | 49.6 |
| 2b | 26.16 | 10.32 | | |
| 3b | −76.64 | 1.78 | 1.589 | 61.3 |
| 4b | −216.81 | 0.10 | | |
| 5b | 47.79 | 3.04 | 1.847 | 23.8 |
| 6b | 111.59 | 43.28 | | |
| 7b | 45.49 | 4.75 | 1.694 | 53.3 |
| 8b | −73.96 | 0.20 | | |
| 9b | 24.86 | 6.03 | 1.487 | 70.4 |
| 10b | −69.88 | 1.00 | 1.847 | 23.8 |
| 11b | 58.02 | 23.51 | | |
| 12b | 80.55 | 1.27 | 1.804 | 46.5 |
| 13b | 21.98 | 5.20 | 1.640 | 34.6 |
| 14b | −95.84 | 5.02 | | |
| 15b | −14.60 | 1.20 | 1.773 | 49.6 |
| 16b | −43.85 | 0.25 | | |
| 17b | 548.05 | 6.10 | 1.517 | 64.2 |
| 18b | −47.25 | 6.48 | | | and the air space 63 between the first and second units of lens elements and the air space 65 between the second and third units of lens elements have lengths as follow at respective effective focal lengths:

| EFFECTIVE FOCAL LENGTH | AIR SPACE 63 | AIR SPACE 65 |
|---|---|---|
| 29.30 | 43.28 | 0.25 |
| 50.00 | 20.74 | 12.10 |
| 84.99 | 7.62 | 32.22 |
| 115.99 | 2.70 | 50.20 |

21. A zoom taking lens as claimed in claim 18, wherein:

said first unit of lens elements includes a first negative meniscus element having surfaces 1f and 2f, a second negative meniscus element having surfaces 3f and 4f, and a third positive meniscus element having surfaces 5f and 6f;

said second unit of lens elements includes a first sub-unit including a biconvex element having surfaces 7f and 8f, and a doublet including a biconvex element having surfaces 9f and 10f, and a biconcave element having surfaces 10f and 11f, and a second sub-unit including a doublet including a positive meniscus element having surfaces 12f and 13f, and a negative meniscus element having surfaces 13f and 14f, and a negative meniscus element having surfaces 15f and 16f;

said third unit includes a biconvex element having surfaces 17f and 18f; and the radii of the surfaces, the thicknesses of the elements and the refractive indices and Abbé V numbers of the elements are as follows:

| SURFACE NO. | RADIUS | THICK-NESS | REFRACTIVE INDEX d | Abbe V NUMBER |
|---|---|---|---|---|
| 1f | 196.37 | 2.20 | 1.773 | 49.6 |
| 2f | 27.30 | 10.91 | | |
| 3f | −79.38 | 2.00 | 1.487 | 70.4 |
| 4f | −508.48 | 0.10 | | |
| 5f | 51.91 | 3.15 | 1.847 | 23.8 |
| 6f | 140.11 | 49.35 | | |
| 7f | 46.11 | 4.45 | 1.694 | 53.3 |
| 8f | −75.90 | 0.20 | | |
| 9f | 25.45 | 5.75 | 1.487 | 70.4 |
| 10f | −74.42 | 1.00 | 1.847 | 23.8 |
| 11f | 62.02 | 26.00 | | |
| 12f | 150.58 | 6.00 | 1.593 | 35.3 |
| 13f | −18.26 | 1.05 | 1.806 | 40.7 |
| 14f | −42.29 | 3.35 | | |
| 15f | −16.30 | 1.20 | 1.804 | 46.5 |
| 16f | −61.93 | 0.25 | | |
| 17f | 3765.78 | 6.00 | 1.620 | 36.3 |
| 18f | −50.68 | 6.50 | | | and the air space 33' between the first and second units of lens elements and the air space 51' between the second and third units of lens elements have lengths as follow, at respective effective focal lengths:

| EFFECTIVE FOCAL LENGTH | AIR SPACE 33' | AIR SPACE 51' |
|---|---|---|
| 29.30 | 41.67 | 0.25 |
| 50.00 | 19.01 | 12.15 |
| 85.00 | 5.84 | 32.42 |
| 116.02 | 0.89 | 50.48 |

22. A zoom taking lens as claimed in claim 18, wherein:

said first unit of lens elements includes a first negative meniscus element having surfaces 1g and 2g, and a second positive meniscus element having surfaces 3g and 4g;

said second unit of lens elements includes a first sub-unit including a biconvex element having surfaces 5g and 6g, and a doublet including a biconvex element having surfaces 7g and 8g, and a biconcave element having surfaces 8g and 9g, and a second sub-unit including a negative meniscus element having surfaces 10g and 11g;

said third unit includes a biconvex element having surfaces 12g and 13g; and the radii of the surfaces, the thicknesses of the elements and the materials of the elements are as follows:

| SURFACE NO. | RADIUS | THICK-NESS | REFRACTIVE INDEX d | Abbe V NUMBER |
|---|---|---|---|---|
| 1g | 2134.57 | 2.00 | 1.773 | 49.6 |
| 2g | 30.07 | 10.56 | | |
| 3g | 38.80 | 3.20 | 1.847 | 23.8 |
| 4g | 54.57 | 46.02 | | |
| 5g | 55.73 | 4.10 | 1.694 | 53.3 |
| 6g | −70.12 | 0.20 | | |
| 7g | 20.67 | 5.85 | 1.501 | 56.3 |

-continued

| SURFACE NO. | RADIUS | THICKNESS | REFRACTIVE INDEX d | Abbe V NUMBER |
|---|---|---|---|---|
| 8g | −117.34 | 1.00 | 1.847 | 23.8 |
| 9g | 48.71 | 31.01 | | |
| 10g | −12.17 | 1.20 | 1.804 | 46.5 |
| 11g | −20.92 | 0.25 | | |
| 12g | 126.28 | 6.90 | 1.806 | 40.7 |
| 13g | −62.59 | 6.50 | | | and the air space 216 between the first and second units of lens elements and the air space 228 between the second and third units of lens elements have lengths as follows at respective focal lengths:

| EFFECTIVE FOCAL LENGTH | AIR SPACE 216 | AIR SPACE 228 |
|---|---|---|
| 29.30 | 38.34 | 0.25 |
| 50.00 | 17.51 | 12.86 |
| 85.00 | 5.44 | 32.33 |
| 116.01 | 0.89 | 53.27 |

23. A zoom taking lens as claimed in claim 18, wherein:
said first lens element unit includes a first negative meniscus element having surfaces 1g and 2g, a second negative meniscus element having surfaces 3h and 4h and a third positive meniscus element having surfaces 5h and 6h;
said second unit of lens elements includes a first sub-unit including a biconvex element having surfaces 7h and 8h, and a doublet including a biconvex element having surfaces 9h and 10h and a biconcave element having surfaces 10h and 11h, and a second sub-unit including a positive meniscus element having surfaces 12h and 13h and a negative meniscus element having surfaces 14h and 15h;
said third unit includes a biconvex element having surfaces 16h and 17h; and
the radii of the surfaces, the thicknesses of the elements and the refractive indices and Abbé V numbers of the elements are as follows:

| SURFACE NO. | RADIUS | THICKNESS | REFRACTIVE INDEX d | Abbe V NUMBER |
|---|---|---|---|---|
| 1h | 178.81 | 2.20 | 1.773 | 49.6 |
| 2h | 27.07 | 10.57 | | |
| 3h | −97.04 | 2.00 | 1.487 | 70.4 |
| 4h | 356.84 | 0.10 | | |
| 5h | 51.05 | 3.25 | 1.847 | 23.8 |
| 6h | 165.03 | 48.79 | | |
| 7h | 44.49 | 4.45 | 1.694 | 53.3 |
| 8h | −74.60 | 0.20 | | |
| 9h | 24.56 | 5.75 | 1.487 | 70.4 |
| 10h | −72.47 | 1.00 | 1.847 | 23.8 |
| 11h | 55.97 | 26.00 | | |
| 12h | −145.36 | 3.96 | 1.847 | 23.8 |
| 13h | −58.17 | 4.73 | | |
| 14h | −14.72 | 1.20 | 1.804 | 46.5 |
| 15h | −36.76 | 0.25 | | |
| 16h | 128.47 | 6.90 | 1.620 | 36.3 |
| 17h | −60.92 | 6.78 | | | and the air space 326 between the first and second units of lens elements and the air space 328 between the second and third units of lens elements have lengths as follows, at respective effective focal lengths:

| EFFECTIVE FOCAL LENGTH | AIR SPACE 326 | AIR SPACE 328 |
|---|---|---|
| 29.29 | 41.11 | 0.25 |
| 49.99 | 18.75 | 13.08 |
| 85.01 | 5.77 | 34.91 |
| 116.06 | 0.90 | 54.29 |

24. A zoom taking lens as claimed in claim 10, including:
an aperture stop located in near proximity in front of the second unit.

25. A zoom taking lens as claimed in claim 10, including:
an aperture stop located in near proximity following a first sub-unit of the second unit.

26. A zoom taking lens as claimed in claim 10, wherein:
said first unit includes a negative meniscus element having surfaces 1c and 2c, a biconcave element having surfaces 3c and 4c, and a positive meniscus element having surfaces 5c and 6c;
said second unit of lens elements includes a first sub-unit of three elements in front of the large air space and a second sub-unit of five elements behind the large air space, the first sub-unit including a biconvex element having surfaces 7c and 8c, and a biconvex element having surfaces 9c and 10c and a biconcave element having surfaces 10c and 11c arranged as a meniscus doublet, the second sub-unit including a biconvex element having surfaces 12c and 13c, a biconcave element having surfaces 14c and 15c and a biconvex element having surfaces 15c and 16c arranged as a negative doublet, a negative meniscus element having surfaces 17c and 18c, and a negative meniscus element having surfaces 19c and 20c; and
said surfaces have radii, the elements have thicknesses, there are spaces between elements, and the refractive indices and Abbé V numbers of the elements are as follows:

| SURFACE NO. | RADIUS | THICKNESS | REFRACTIVE INDEX d | Abbe V NUMBER |
|---|---|---|---|---|
| 1c | 527.19 | 1.57 | 1.835 | 43.0 |
| 2c | 24.88 | 4.65 | | |
| 3c | −191.08 | 1.55 | 1.835 | 43.0 |
| 4c | 238.55 | 3.22 | | |
| 5c | 48.32 | 3.39 | 1.830 | 24.0 |
| 6c | 950.17 | 41.83 | | |
| 7c | 33.06 | 5.34 | 1.487 | 70.4 |
| 8c | −55.72 | 0.17 | | |
| 9c | 23.69 | 5.65 | 1.501 | 56.3 |
| 10c | −52.31 | 1.00 | 1.847 | 23.8 |
| 11c | 84.66 | 19.50 | | |
| 12c | 34.63 | 4.40 | 1.487 | 70.4 |
| 13c | −28.50 | 0.70 | | |
| 14c | −20.47 | 1.00 | 1.804 | 46.5 |
| 15c | 19.85 | 6.76 | 1.687 | 31.9 |
| 16c | −35.05 | 1.75 | | |
| 17c | −20.48 | 1.04 | 1.835 | 43.0 |
| 18c | −32.89 | 4.15 | | |
| 19c | −19.74 | 1.31 | 1.773 | 49.6 |
| 20c | −36.60 | 6.81 | | | and the air space between the first and second units of lens elements has a length as follows for respective effective focal lengths:

| EFFECTIVE FOCAL LENGTH | AIR SPACE |
| --- | --- |
| 29.30 | 36.03 |
| 50.00 | 16.53 |
| 85.01 | 5.17 |
| 101.02 | 2.60 |

27. A zoom taking lens as claimed in claim 10, wherein:
   said first unit includes a negative meniscus element having surfaces 1d and 2d, a biconcave element having surfaces 3d and 4d, and a positive meniscus element having surfaces 5d and 6d;
   said second unit of lens elements includes a first sub-unit including three elements in front of the large air space and a second sub-unit including five elements behind the large air space, the first sub-unit including a biconvex element having surfaces 7d and 8d, and a biconvex element having surfaces 9d and 10d and a biconcave element having surfaces 10d and 11d arranged as a meniscus doublet, the second sub-unit including a biconvex element having surfaces 12d and 13d, a biconcave element having surfaces 14d and 15d and a biconvex element having surfaces 15d and 16d arranged as a negative doublet, a negative meniscus element having surfaces 17d and 18d, and a negative meniscus element having surfaces 19d and 20d; and
   said surfaces have radii, the elements have thicknesses, there are spaces between elements, and the refractive indices and Abbé V numbers of the elements are as follows:

| SURFACE NO. | RADIUS | THICKNESS | REFRACTIVE INDEX d | Abbe V NUMBER |
| --- | --- | --- | --- | --- |
| 1d | 1497.05 | 1.80 | 1.835 | 43.0 |
| 2d | 32.74 | 4.95 | | |
| 3d | 594.43 | 1.78 | 1.835 | 43.0 |
| 4d | 59.55 | 5.27 | | |
| 5d | 56.11 | 4.30 | 1.785 | 26.1 |
| 6d | −370.00 | 52.70 | | |
| 7d | 36.58 | 5.58 | 1.487 | 70.4 |
| 8d | −69.18 | 0.20 | | |
| 9d | 25.58 | 6.60 | 1.501 | 56.3 |
| 10d | −60.42 | 1.00 | 1.847 | 23.8 |
| 11d | 84.06 | 22.00 | | |
| 12d | 36.46 | 4.20 | 1.487 | 70.4 |
| 13d | −26.01 | 0.29 | | |
| 14d | −22.94 | 1.00 | 1.804 | 46.5 |
| 15d | 24.88 | 6.38 | 1.673 | 32.2 |
| 16d | −32.50 | 1.09 | | |
| 17d | −21.63 | 0.80 | 1.835 | 43.0 |
| 18d | −35.82 | 6.87 | | |
| 19d | −19.92 | 1.50 | 1.773 | 49.6 |
| 20d | −48.90 | 6.50 | | | and the air space between the first and second units of lens elements has a length as follows, for respective effective focal lengths:

| EFFECTIVE FOCAL LENGTH | AIR SPACE |
| --- | --- |
| 29.30 | 45.14 |
| 50.00 | 20.51 |
| 85.01 | 6.16 |
| 116.01 | 0.68 |

28. A zoom taking lens as claimed in claim 10, wherein:
   said first unit includes a negative meniscus element having surfaces 1e and 2e, a biconcave element having surfaces 3e and 4e, and a positive meniscus element having surfaces 5e and 6e;
   said second unit of lens elements includes a first sub-unit of three elements in front of the large air space and a second sub-unit of five elements behind the large air space, the first sub-unit including a biconvex element having surfaces 7e and 8e, and a biconvex element having surfaces 9e and 10e and a biconcave element having surfaces 10e and 11e arranged as a meniscus doublet, the second sub-unit including a biconvex element having surfaces 12e and 13e, a biconcave element having surfaces 14e and 15e and a biconvex element having surfaces 15e and 16e arranged as a negative doublet, a negative meniscus element having surfaces 17e and 18e, and a negative meniscus element having surfaces 19e and 20e; and
   said surfaces have radii, the elements have thicknesses, there are spaces between elements, and the elements are formed of materials as defined in:

| SURFACE NO. | RADIUS | THICKNESS | REFRACTIVE INDEX d | Abbe V NUMBER |
| --- | --- | --- | --- | --- |
| 1e | −278.18 | 1.80 | 1.835 | 43.0 |
| 2e | 37.82 | 3.89 | | |
| 3e | 238.35 | 1.80 | 1.834 | 37.3 |
| 4e | 62.99 | 6.54 | | |
| 5e | 60.92 | 4.06 | 1.805 | 25.5 |
| 6e | −731.43 | 54.78 | | |
| 7e | 38.66 | 5.89 | 1.517 | 52.2 |
| 8e | −62.93 | 0.20 | | |
| 9e | 27.72 | 6.72 | 1.501 | 56.3 |
| 10e | −49.55 | 1.00 | 1.847 | 23.8 |
| 11e | 79.47 | 24.14 | | |
| 12e | 30.16 | 4.31 | 1.487 | 70.4 |
| 13e | −39.52 | 0.20 | | |
| 14e | −40.93 | 1.00 | 1.804 | 46.5 |
| 15e | 19.23 | 7.56 | 1.640 | 34.6 |
| 16e | −28.45 | 1.04 | | |
| 17e | −20.44 | 1.00 | 1.835 | 43.0 |
| 18e | −41.77 | 5.01 | | |
| 19e | −19.52 | 1.50 | 1.773 | 49.6 |
| 20e | −61.52 | 6.50 | | | and the air space between the first and second units of lens elements has a length as follows for respective effective focal lengths:

| EFFECTIVE FOCAL LENGTH | AIR SPACE 106 |
| --- | --- |
| 29.30 | 46.22 |
| 50.00 | 21.30 |
| 85.00 | 6.38 |
| 116.00 | 0.68 |

29. A zoom taking lens as claimed in claim 1, including:
a third lens element unit which is positive.

30. A zoom taking lens for a photographic SLR camera having a short focal length less than the diagonal dimension of the image created on the film plane of the camera by the lens, said lens having a front to be towards an object to be photographed and an axis, and including:
a negative first lens unit at the front of said lens;
a positive second lens unit including a positive first sub-unit and a negative second sub-unit, the first and second sub-units being separated by an air space sufficiently large to accommodate axially movable reflective means for directing light received from the object through said first unit and through at least one element of the second unit, laterally of the axis to viewfinder means;
said positive second lens unit being movable for zooming; and
said first lens unit has an air space, or air spaces, the length, or sum of the lengths, of which is or are greater than 10% of the focal length at the short focal length extreme condition of the lens.

31. A zoom taking lens as claimed in claim 30, wherein:
the ratio of the absolute value of the focal length of the first unit to the focal length of the second unit lies in the range of 1.4 to 1, to 2.8 to 1.

32. A zoom taking lens as claimed in claim 30, wherein:
said first lens unit moves to provide focus compensation.

33. A zoom taking lens as claimed in claim 30, including:
a field flattening lens unit near the film plane of the camera.

34. A zoom taking lens as claimed in claim 30, wherein:
the lens elements of the first lens unit are all meniscus.

* * * * *

UNITED STATES PATENT OFFICE
CERTIFICATE OF CORRECTION

PATENT NO. : 4,838,668

DATED : June 13, 1989

INVENTOR(S) : Ellis I. Betensky & Melvyn H. Kreitzer

It is certified that error appears in the above-identified patent and that said Letters Patent is hereby corrected as shown below:

Col. 11, line 50, Claim 15, after "claim" delete "12" and insert --14--.

Col. 12, line 25, Claim 19, after and (second occurrence) delete "Abbeé" and insert --Abbé--.

Signed and Sealed this

Second Day of October, 1990

Attest:

HARRY F. MANBECK, JR.

Attesting Officer         Commissioner of Patents and Trademarks